US010496883B2

(12) United States Patent
Kwan

(10) Patent No.: US 10,496,883 B2
(45) Date of Patent: Dec. 3, 2019

(54) METHOD AND SYSTEM FOR ENHANCING PREDICTIVE ACCURACY OF PLANET SURFACE CHARACTERISTICS FROM ORBIT

(71) Applicant: Signal Processing, Inc., Rockville, MD (US)

(72) Inventor: Chiman Kwan, Rockville, MD (US)

(*) Notice: Subject to any disclaimer, the term of this patent is extended or adjusted under 35 U.S.C. 154(b) by 397 days.

(21) Appl. No.: 15/417,910

(22) Filed: Jan. 27, 2017

(65) Prior Publication Data
US 2018/0218197 A1    Aug. 2, 2018

(51) Int. Cl.
*G06K 9/00* (2006.01)
*G06K 9/62* (2006.01)
(Continued)

(52) U.S. Cl.
CPC ......... *G06K 9/0063* (2013.01); *G06K 9/2018* (2013.01); *G06K 9/6249* (2013.01); *G06K 9/6284* (2013.01); *G06T 3/4069* (2013.01); *G06T 5/003* (2013.01); *G06T 5/50* (2013.01); *G06T 7/33* (2017.01); *G06T 7/35* (2017.01);
(Continued)

(58) Field of Classification Search
CPC ...... G06K 2009/363; G06K 2009/2045; G06T 3/00; G06T 3/0093; G06T 5/006; G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 5/2628; H04N 1/3876; H04N 5/23238
See application file for complete search history.

(56) References Cited

U.S. PATENT DOCUMENTS 8,761,506 B1* 6/2014 Padwick .............. G06K 9/0063
382/167

OTHER PUBLICATIONS

Dwivedi et al. ("The Utility of IRS-1C LISS-III and PAN-Merged Data for Mapping Salt-Affected Soils", American Society for Photogrammetry and Remote Sensing, vol. 67, No. 10, Oct. 2001, pp. 1167-1175).*

(Continued)

*Primary Examiner* — Duy M Dang
(74) *Attorney, Agent, or Firm* — IP-R-US, LLC; Peter S. Wong

(57) ABSTRACT

A method and system for enhancing predictive accuracy of planet surface characteristics from orbit using an extended approach of Pan-Sharpening by using multiple high resolution bands to reconstruct high resolution hyperspectral image is disclosed. Sparsity based classification algorithm is applied to rock type classification. An Extended Yale B face database is used for performance evaluation; and utilizing deep Neural Networks for pixel classification. The present invention presents a system that can significantly enhance the predictive accuracy of surface characteristics from the orbit. The system utilizes complementary images collected from imagers onboard satellites. The present system and method generates high spatial high spectral resolution images; accurate detection of anomalous regions on Mars, Earth, or other planet surfaces; accurate rock/material classification using orbital data and the surface characterization performance will be comparable to in-situ results; and accurate chemical concentration estimation of rocks.

16 Claims, 7 Drawing Sheets

Proposed high performance system for enhancing the predictive accuracy of Mars surface characteristics from orbit.

(51) Int. Cl.
| | |
|---|---|
| *G06T 5/00* | (2006.01) |
| *G06T 5/50* | (2006.01) |
| *G06T 7/33* | (2017.01) |
| *G06T 7/35* | (2017.01) |
| *G06K 9/20* | (2006.01) |
| *G06T 3/40* | (2006.01) |

(52) U.S. Cl.
CPC .............. *G06T 2207/10024* (2013.01); *G06T 2207/10036* (2013.01); *G06T 2207/10041* (2013.01); *G06T 2207/20076* (2013.01); *G06T 2207/20084* (2013.01); *G06T 2207/20221* (2013.01)

(56) References Cited

OTHER PUBLICATIONS

K. G. Derpanis, "Overview of the RANSAC Algorithm," Lecture Notes, York University, 2010.
H. Bay, A. Ess, T. Tuytelaars, and L. Van Gool, "SURF: Speeded Up Robust Features," Computer Vision and Image Understanding (CVIU), vol. 110, No. 3, pp. 346-359, 2008.
D. G. Lowe, "Object Recognition From Local Scale-invariant Features," IEEE International Conference on Computer Vision, vol. 2, pp. 1150-1157, 1999.
H. Chen, A. Goela, G. J. Garvin, S. and Li, "A Parameterization of Deformation Fields for Diffeomorphic Image Registration and Its Application to Myocardial Delineation," Medical Image Computing and Computer-Assisted Intervention—MICCAI 2010 Lecture Notes in Computer Science, vol. 6361, 2010, pp. 340-348.
H. Kwon and N.M. Narabadi, "Kernel RXalgorithm: A Nonlinear Anomaly Detector for Hyperspectral Imagery," IEEE Transactions on Geoscience and Remote Sensing, vol. 43, No. 2, Feb. 2005.
J. Zhou, C. Kwan, B. Ayhan, and M. Eismann, "A Novel Cluster Kernel RX Algorithm for Anomaly and Change Detection Using Hyperspectral Images," IEEE Trans. Geoscience and Remote Sensing, vol. 54, Issue: 11, pp. 6497-6504, Nov. 2016.
C. Kwan, B. Ayhan, G. Chen, C. Chang, J. Wang, and B. Ji, "A Novel Approach for Spectral Unmixing, Classification, and Concentration Estimation of Chemical and Biological Agents," IEEE Trans. Geoscience and Remote Sensing, pp. 409-419, vol. 44, No. 2, Feb. 2006.
J. Zhou, C. Kwan, and B. Budavari, "Hyperspectral Image Super-Resolution: A Hybrid Color Mapping Approach," SPIE Journal of Applied Remote Sensing, Sep. 2016.
C. Kwan, J. H. Choi, S. Chan, J. Zhou, and B. Budavari, "Resolution Enhancement for Hyperspectral Images: A Super-Resolution and Fusion Approach," International Conference Acoustics, Speech, and Signal Processing, 2017.
C. Kwan, B. Budavari, M. Dao, B. Ayhan, and J. Bell, "Pansharpening of Mastcam images," submitted to 2017 International Geoscience and Remote Sensing Symposium (IGARSS).
M. Dao, C. Kwan, B. Ayhan, and J. Bell, "Enhancing Mastcam Images for Mars Rover Mission," submitted to International Symposium on Neural Networks, 2017.
M. Dao, C. Kwan, B. Ayhan, and T. Tran, "Burn Scar Detection Using Cloudy MODIS Images via Low-rank and Sparsity-based Models," IEEE Global Conference on Signal and Information Processing, Washington, D.C., Dec. 7-9, 2016.
T. D. Tran, "Locally Adaptive Sparse Representation for Detection, Classification, and Recognition," Signals and Systems Area Seminar, Johns Hopkins University, Baltimore MD.
B. Ayhan and C. Kwan, "Application of Deep Belief Network to Land Classification Using Hyperspectral Images," International Symposium on Neural Networks 2017.

* cited by examiner

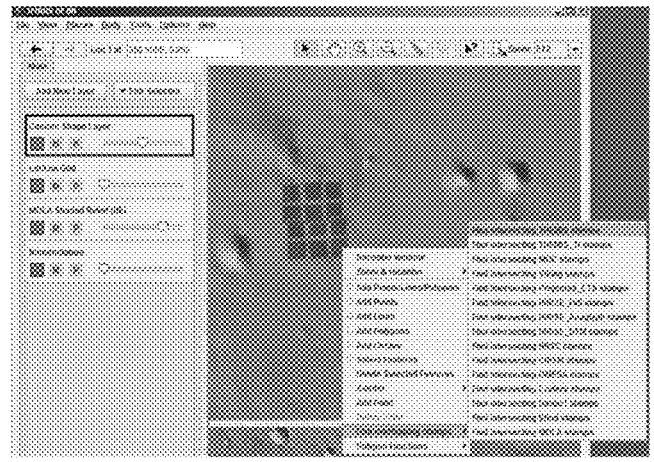
Fig. 1: Spatial resolution difference between THEMIS and TES. Background shows one band of THEMIS. Each darker square shows a single TES pixel.
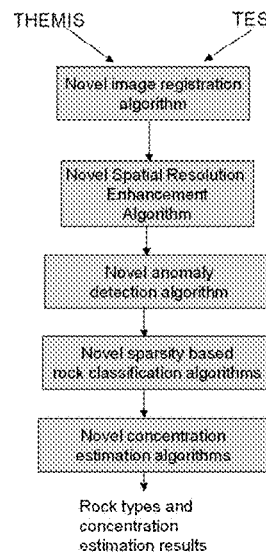
Fig. 2: Proposed high performance system for enhancing the predictive accuracy of Mars surface characteristics from orbit.

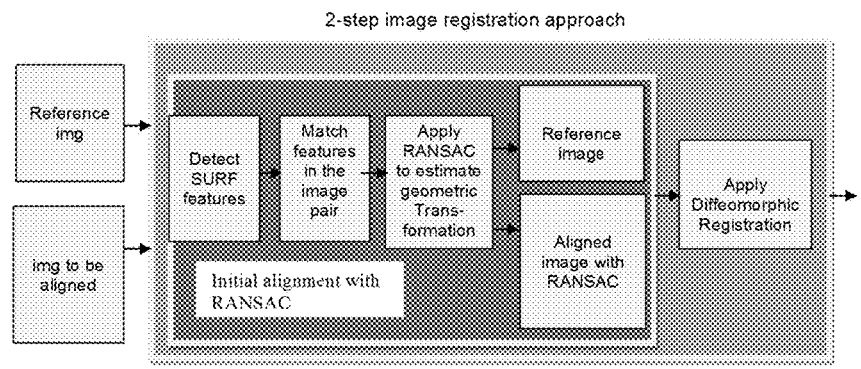
Fig. 3: Two-step image registration approach.
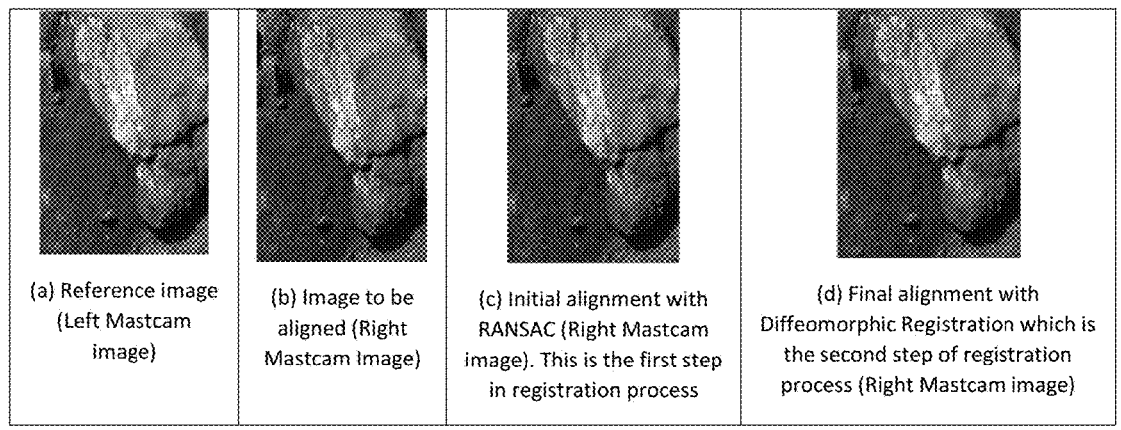
Fig. 4 Alignment results with the two-step registration approach.
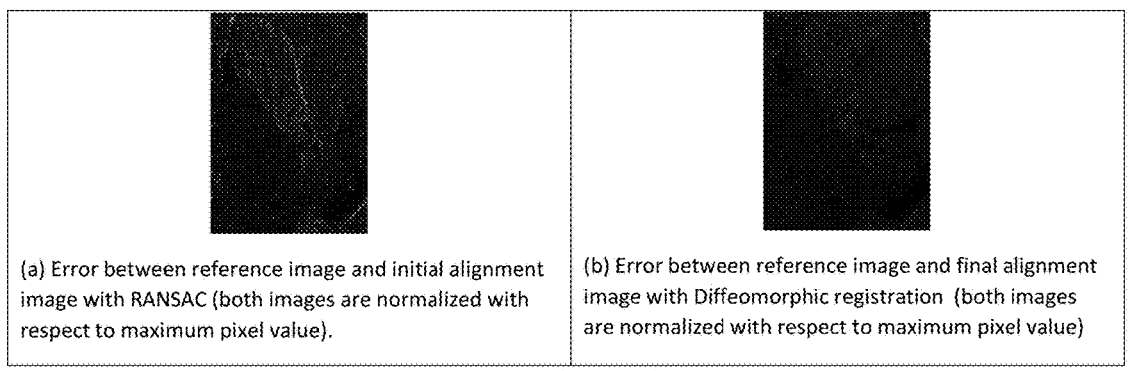
Fig. 5 Error difference images with the two-step registration process.

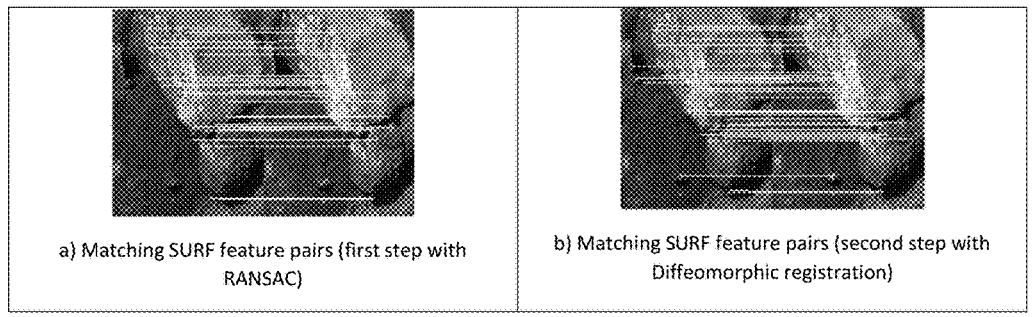
a) Matching SURF feature pairs (first step with RANSAC)
b) Matching SURF feature pairs (second step with Diffeomorphic registration)
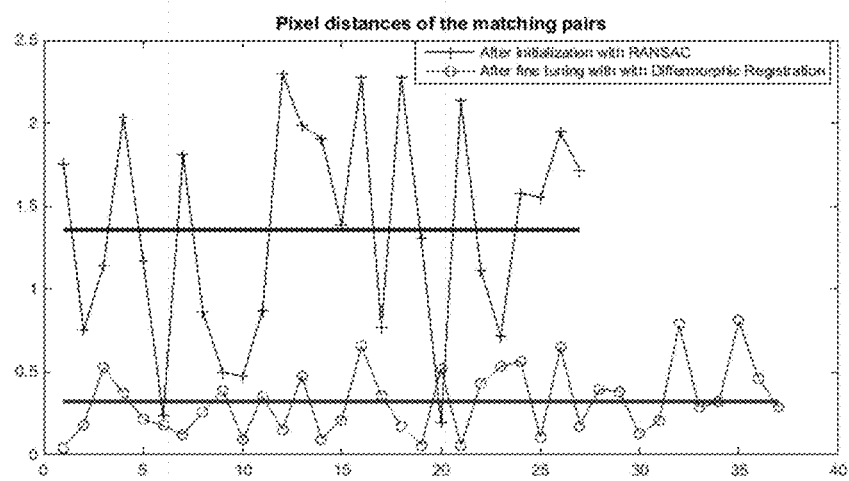
c) Pixel distances in the matched features in each step of the two-step registration approach
Fig. 6: Evaluating the alignment accuracy with a pixel-distance based measure in the two-step registration process.

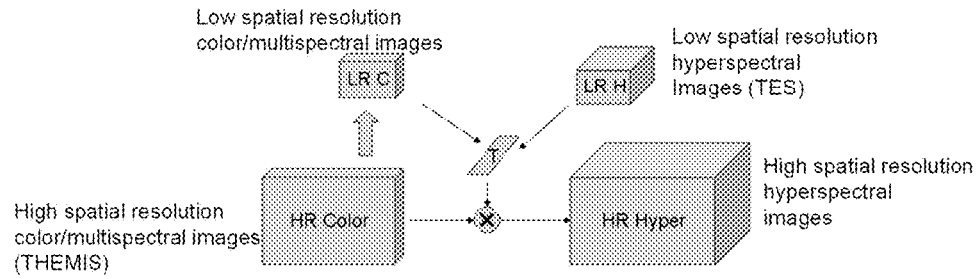
Fig. 7: System flow of color mapping for generating high spatial resolution hyperspectral images.
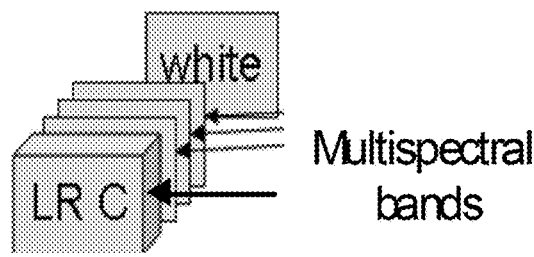
Fig. 8: Hybrid color mapping. Multispectral bands with the addition of a white band.
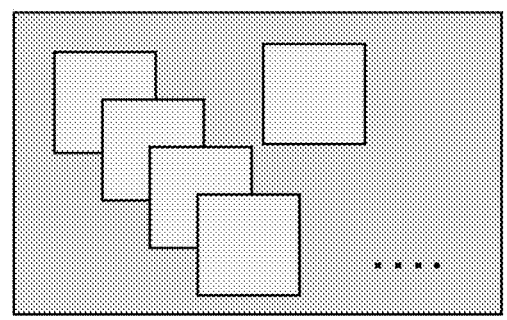
Fig. 9: Local color mapping.

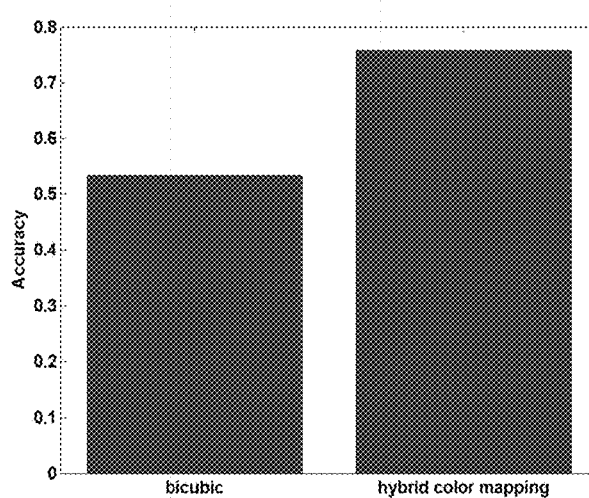
Fig. 10: Comparison of spatial resolution enhancement methods. Hhybrid color mapping algorithm yielded much better classification accuracy
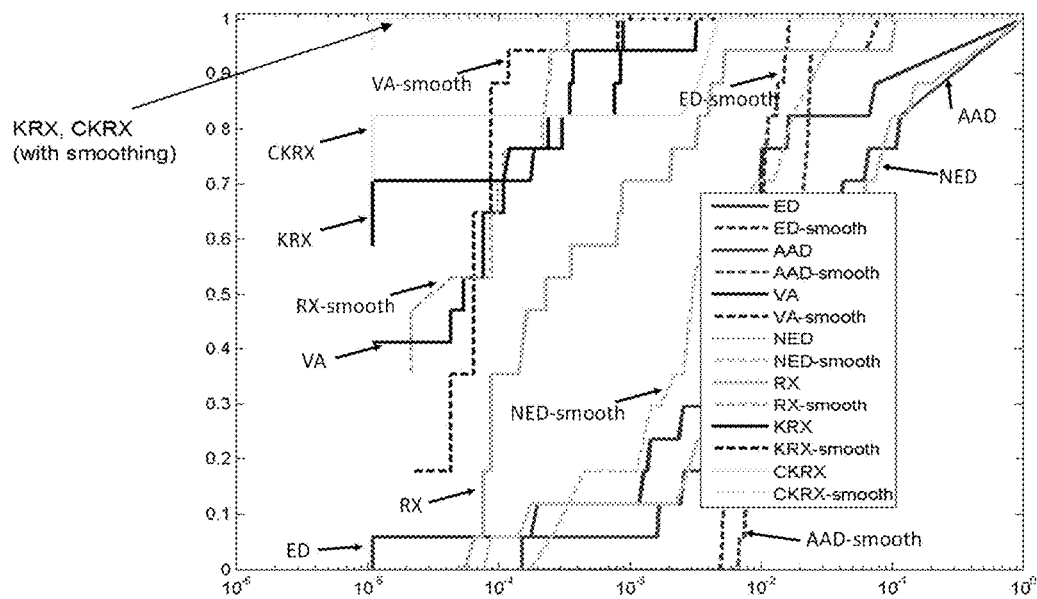
Fig. 11: ROC curves using anomaly detection results. The performance of CKRX and KRX reached almost optimal performance as compared to others.

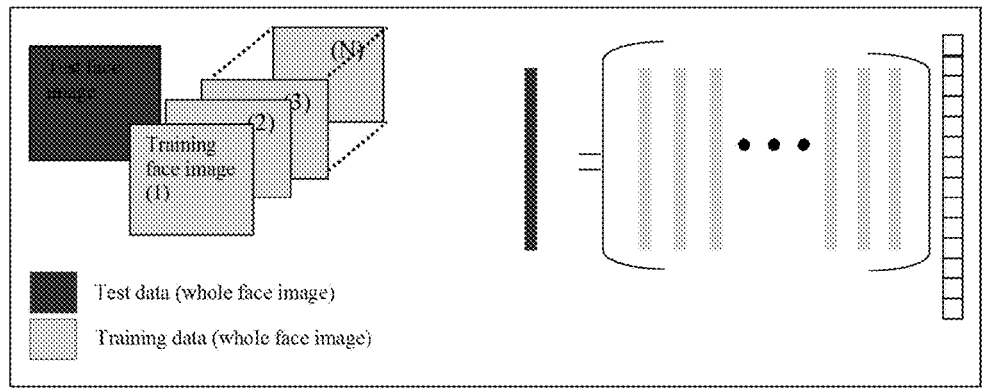
Fig. 12: Illustrative diagram of the global version of the sparsity-driven face recognition method.
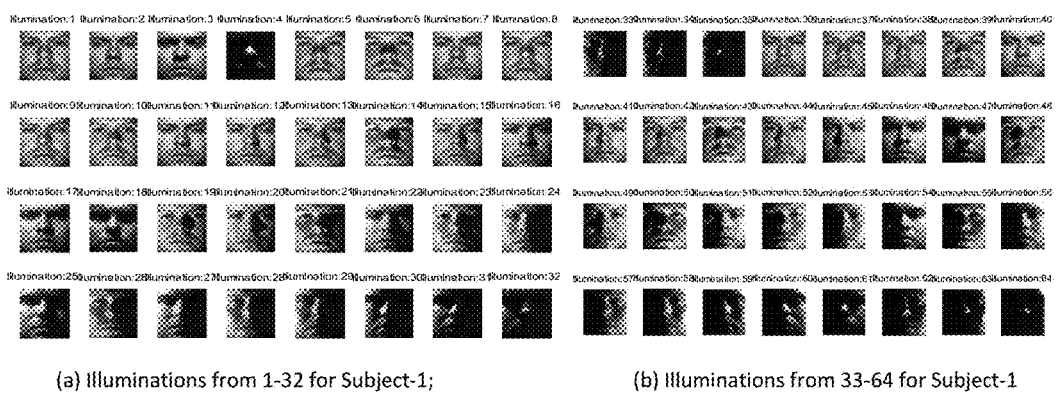
(a) Illuminations from 1-32 for Subject-1;  (b) Illuminations from 33-64 for Subject-1
Fig. 13: Face images of Subject-1 in 64 different lighting conditions in the Yale B face database. Lots of poor illuminated images in the database.

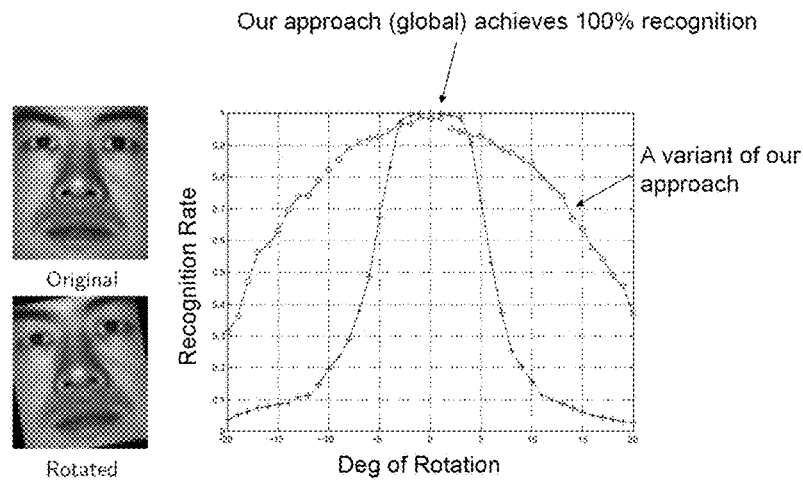
Fig. 14: Classification results of the proposed algorithm handling both poor illuminated images as well as rotated images.
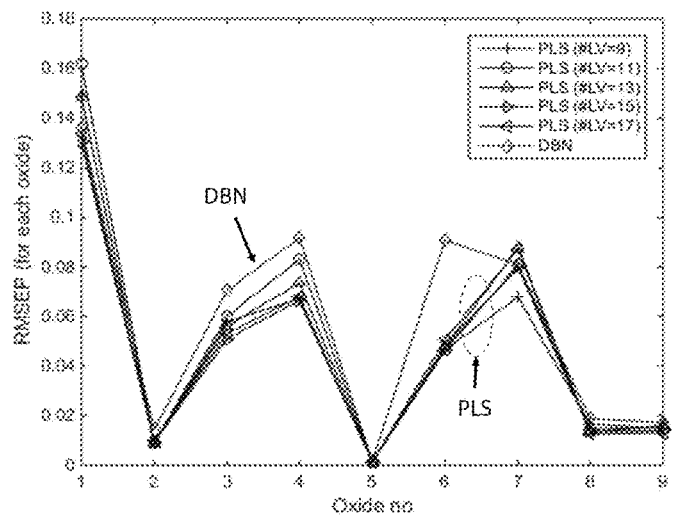
Fig. 15 Preliminary results with the adaptation of DBN technique to chemical composition estimation in LIBS. RMSEP values for each oxide compound (there are 9 oxides, lower RMSEP indicates better estimation accuracy).

METHOD AND SYSTEM FOR ENHANCING PREDICTIVE ACCURACY OF PLANET SURFACE CHARACTERISTICS FROM ORBIT

BACKGROUND OF THE INVENTION

Thermal Emission Imaging System (THEMIS) and Thermal Emission Spectrometer (TES) are orbital multispectral imagers that can be used for surface characterization of Mars. THEMIS has 10 spectral bands in the 6-13 micrometers region and a spatial resolution of 100 m. TES has 143 spectral bands in the 5-50 micrometers range, but with low spatial resolution of 3×6 km. Although all of them have been used to map out the surface characteristics of Mars, there are some limitations. First, THEMIS has low spectral resolution that may not provide accurate surface characterization. Second, TES has low spatial resolution that cannot provide fine details of surface characteristics. FIG. 1 illustrates the spatial difference between THEMIS and TES images. Roughly speaking, each TES pixel contains about 900 THEMIS pixels.

For Earth observations, there are imagers that are like the above instruments for Mars. For example, the Worldview-3 imager collects high resolution visible and short-wave infrared (SWIR) images at sub-meter resolution whereas the NASA's Moderate Resolution Imaging Spectroradiometer (MODIS), NOAA's Advanced Very High Resolution Radiometer (AVHRR), etc. are collecting low resolution (hundreds of meters) multispectral images. For some future hyperspectral imagers like the NASA Hyperspectral Infrared Imager (HyspIRI) with hundreds of bands, the spatial resolution is only about 30 meters. It is advantageous to fuse the high-resolution Worldview images with MODIS, AVHRR, and HyspIRI images to yield high resolution in both spatial and spectral domains. Consequently, many applications, including urban monitoring, vegetation monitoring, fire and flood damage assessment, etc., could benefit from the high spatial and high spectral resolution images.

To align two images, one technique known as Random Sample Consensus (RANSAC) is shown in a paper by K. G. DERPANIS, "Overview of the RANSAC Algorithm, Lecture Notes, York University, 2010." RANSAC can be used by two types of features, Speeded Up Robust Features (SURF) and Scale Invariant Feature Transform (SIFT), as discussed in the following papers by:
1. H. Bay, A. ESS, T. TUYTELAARS, and L. VAN GOOL, "SURF: Speeded Up Robust Features, Computer Vision and Image Understanding (CVIU), Vol. 110, No. 3, pp. 346-359, 2008," by; and
2. D. G. LOWE, "Object Recognition From Local Scale-invariant Features, *IEEE International Conference on Computer Vision*, vol. 2, pp. 1150-1157, 1999." In this paper, the features are detected in both images, matched, and followed by applying RANSAC to estimate the geometric transformation.

Another more accurate registration algorithm is the Diffeomorphic Image Registration (DIR), as shown in a paper by H. CHEN, A. GOELA, G. J. GARVIN, S. and LI, "A Parameterization of Deformation Fields for Diffeomorphic Image Registration and Its Application to Myocardial Delineation, Medical Image Computing and Computer-Assisted Intervention—MICCAI 2010 Lecture Notes in Computer Science, Volume 6361, 2010, pp 340-348."

As discussed in another paper by H. KWON and N. M. NARABADI, "Kernel RX-algorithm: A Nonlinear Anomaly Detector for Hyperspectral Imagery, IEEE Transactions on Geoscience and Remote Sensing, Vol. 43, No. 2, February 2005." The Kernel RX-algorithm is a generalization of the well-known anomaly detection algorithm, known as Reed-Xiaoli (RX) algorithm. When the kernel distance function is defined as the dot product of two vectors, Kernel RX is more flexible than RX, but it is significantly slower.

In the present invention, a novel algorithm can perform a fast approximation of Kernel RX, as disclosed in a paper by J. ZHOU, C. KWAN, B. AYHAN, and M. EISMANN, "A Novel Cluster Kernel RX Algorithm for Anomaly and Change Detection Using Hyperspectral Images, IEEE Trans. Geoscience and Remote Sensing, Volume: 54, Issue: 11, pp. 6497-6504, November 2016." The novel algorithm is based on clustering, called Cluster Kernel RX (CKRX). As a matter of fact, CKRX is a generalization of Kernel RX (KRX), i.e. CKRX is reduced to Kernel RX under some specific settings.

The basic idea of CKRX is to first cluster the background points and then replace each point with its cluster's center. After replacement, the number of unique points is the number of clusters, which can be very small comparing to the original point set. Although the total number of points does not change, the computation of the anomaly value can be simplified using only the unique cluster centers, which improves the speed by several orders of magnitudes.

The paper mentioned above showed that some Receiver Operating Characteristics (ROC) curves were obtained by using actual hyperspectral images from the Air Force (AF). Many algorithms implemented and compared in that paper. Also, FIG. 11 of the present invention shows the ROC curves, showing that KRX and CKRX gave excellent performance, as their ROC curves almost reach ideal performance.

In surface characterization, accurate material classification is important for mapping out the planet's surface. There are some existing classification algorithms as shown in another paper by C. KWAN, B. AYHAN, G. CHEN, C. CHANG, J. WANG, and B. Ji, "A Novel Approach for Spectral Unmixing, Classification, and Concentration Estimation of Chemical and Biological Agents, IEEE Trans. Geoscience and Remote Sensing, pp. 409-419, vol. 44, no. 2, February 2006."

In remote sensing domain, a common and successful approach to achieving super resolution is Pan-Sharpening. Pan-Sharpening is an image fusion technique which uses a high resolution single band panchromatic image and low resolution multi-spectral image to produce high resolution multi-spectral images. Compared to multi-view based and example based super-resolution technique, Pan-Sharpening can produce much higher resolution data and is much more reliable and accurate. The Pan-Sharpening idea can also be applied to hyperspectral images, as disclosed in some articles by:
1) J. ZHOU, C. KWAN, and B. BUDAVARI, "Hyperspectral Image Super-Resolution: A Hybrid Color Mapping Approach, SPIE Journal of Applied Remote Sensing, September, 2016";
2) C. KWAN, J. H. CHOI, S. CHAN, J. ZHOU, and B. BUDAVARI, "Resolution Enhancement for Hyperspectral Images: A Super-Resolution and Fusion Approach, International Conference Acoustics, Speech, and Signal Processing 2017";
3) C. KWAN, B. BUDAVARI, M. DAO, B. AYHAN, and J. BELL, "Pansharpening of Mastcam images, submitted to 2017 International Geoscience and Remote Sensing Symposium (IGARSS)"; and 4) M. DAO, C. KWAN, B. AYHAN, and J. BELL, "Enhancing Mastcam Images for Mars Rover Mission, submitted to International Symposium on Neural Networks 2017."

SUMMARY OF THE INVENTION

In the present invention, a novel approach which extends the idea of Pan-Sharpening by using multiple high resolution bands to reconstruct high resolution hyperspectral image was developed. The motivation is practical, since there are many satellite sensors or airborne sensors which take high resolution color images. For instance, the resolution of IKONOS color image data is 0.5 meter.

Sparsity based classification algorithm to rock type classification, such as the method described in an article by M. DAO, C. KWAN, B. AYHAN, and T. TRAN, "Burn Scar Detection Using Cloudy MODIS Images via Low-rank and Sparsity-based Models, IEEE Global Conference on Signal and Information Processing, Washington, D.C., Dec. 7-9, 2016."

The Extended Yale B face database, as disclosed in a paper by T. D. TRAN, "Locally Adaptive Sparse Representation for Detection, Classification, and Recognition, Signals and Systems Area Seminar, Johns Hopkins University, Baltimore Md.," has been used for performance evaluation. In addition to frontal face images, the present invention introduced rotation effects to the test face images to examine the robustness of the global (whole face) and local (blocks of the face image) versions of the method. The Yale B database contains face images with different illuminations, which are very challenging.

Support Vector Machine (SVM) and non-deep Neural Networks (NN) have been used in many pattern classification applications. However, the present invention believes there is a lot of room for further improvement. This is because SVM and non-deep NN have only one or two layers of tunable parameters. Since pattern recognition and concentration estimation are complex and involve sophisticated features, SVM and non-deep NN may be restricted in achieving high classification rate. This invention proposes to apply deep NN as disclosed in a paper by B. AYHAN and C. KWAN, "Application of Deep Belief Network to Land Classification Using Hyperspectral Images, Int. Symposium on Neural Networks 2017," for pixel classification.

The present invention uses the THEMIS and TES imagers for Mars exploration as an example for illustrating the key ideas of the present invention. These ideas can be naturally extended to many other imagers for observing the Earth and possibly other planets in the solar system.

The present invention presents a system that can significantly enhance the predictive accuracy of surface characteristics from the orbit. The system utilizes complementary images collected from imagers onboard satellites. Significant improvement of the state-of-the-art performance is expected in several important aspects:

1) The generation of high spatial high spectral resolution images;
2) accurate detection of anomalous regions on Mars, Earth, or other planet surfaces;
3) accurate rock/material classification using orbital data and the surface characterization performance will be comparable to in-situ results; and
4) accurate chemical concentration estimation of rocks.

One embodiment of the present invention is to incorporate a novel two-step image registration algorithm that can achieve sub-pixel accuracy. This algorithm enables accurate image alignment between two images collected from different imagers.

Another embodiment of the present invention is to utilize a novel spatial resolution enhancement algorithm to improve the spatial resolution of satellite images. This will allow users to visualize fine details of the Mars surface characteristics. Moreover, the high resolution fused images will also help improve subsequent data analysis tasks such as anomaly detection, material classification, and chemical concentration estimation.

Another embodiment of the present invention is to adopt a novel anomaly detection algorithm that can process the fused high spatial resolution images and generate alerts for regions that are different from the neighbors.

Another embodiment of the present invention is to apply a novel sparsity based algorithm for classification for surface materials.

Another embodiment of the present invention is to incorporate an accurate Deep Neural Network (DNN) algorithm for concentration estimation of certain materials in the Mars surface.

Another embodiment of the present invention is that the processing software can be executed in a local personal computer or in a Cloud.

Another embodiment of the present invention is to provide user friendly Graphical User Interface (GUI) that will allow operators to visualize the fused high resolution images, the anomalous regions, the concentration estimation results, and surface material classification results.

BRIEF DESCRIPTION OF THE DRAWINGS

FIG. 1 illustrates the spatial resolution difference between Thermal Emission Imaging System (THEMIS) and Thermal Emission Spectrometer (TES). Background shows one band of THEMIS. Each darker square shows a single TES pixel.

FIG. 2 illustrates the proposed high performance system for enhancing the predictive accuracy of Mars surface characteristics from orbit.

FIG. 3 illustrates a two-step image registration approach.

FIG. 4 illustrates the alignment results with the two-step registration approach.

FIG. 5 illustrates error difference images with the two-step registration process. (a) shows error between reference image and initial alignment image with Random Sample Consensus (RANSAC). Both images are normalized with respect to maximum pixel value; and (b) shows error between reference image and final alignment image with Diffeomorphic registration Both images are normalized with respect to maximum pixel value.

FIG. 6 illustrates evaluating the alignment accuracy with a pixel-distance based measure in the two-step registration process. (a) shows the matching Speeded Up Robust Features (SURF) feature pairs, which is the first step with RANSAC; (b) shows the matching SURF feature pairs, which is the second step with Diffeomorphic registration: and (c) shows pixel distances in the matched features in each step of the two-step registration approach.

FIG. 7 illustrates the system flow of color mapping. This approach can be used to generate high spatial resolution hyperspectral images.

FIG. 8 illustrates the hybrid color mapping. Multispectral bands with the addition of a white band.

FIG. 9 illustrates the local color mapping.

FIG. 10 illustrates the comparison of spatial resolution enhancement methods. The hybrid color mapping algorithm yielded much better classification accuracy.

FIG. 11 illustrates Receiver Operating Characteristics (ROC) curves using anomaly detection results. The performance of Cluster Kernel RX (CKRX) and Kernel RX (KRX) reached almost optimal performance as compared to others.

FIG. 12 illustrates an illustrative diagram of the global version of the sparsity-driven face recognition method.

FIG. 13 illustrates the face images of Subject-1 in 64 different lighting conditions in the Yale B face database. There are a lot of poor illuminated images in the database. (a) shows illuminations from 1-32 for Subject-1; and (b) shows illuminations from 33-64 for Subject-1.

FIG. 14 illustrates the classification results of the proposed algorithm. The proposed algorithm can handle both poor illuminated images as well as rotated images.

FIG. 15 illustrates preliminary results with the adaptation of Deep Belief Network (DBN) technique to chemical composition estimation in Laser Induced Breakdown Spectroscopy (LIBS). It shows the Root-Mean-Square Error of Prediction (RMSEP) values for each oxide compound. There are 9 oxides, lower RMSEP indicates better estimation accuracy.

DETAIL DESCRIPTION OF THE INVENTION

Referring to FIG. 2, it shows the architecture of the proposed system of the present invention for Mars surface characterization using THEMIS and TES images. Accurate image registration is a prerequisite to super-resolution image generation. The present invention proposes a novel and accurate 2-step algorithm to achieve sub-pixel registration accuracy. Initial alignment results using Mastcam (a multi-spectral imager) in Mars rover clearly showed that the proposed algorithm is promising. The proposed 2-step algorithm can be applicable to RGB, multispectral and hyperspectral images. In the spatial resolution enhancement part, a novel algorithm that incorporates a high spatial resolution multispectral image from THEMIS and another image from TES with low spatial but high spectral resolution to generate a high spatial resolution hyperspectral image is applied. Preliminary results showed that the performance of the 2-step algorithm is very encouraging. In the anomaly detection part, a proven and high performance kernel based algorithm to accurately determine the anomalous regions on Mars surface is utilized. Applying a novel anomaly detection algorithm to some hyperspectral images from the US Air Force achieved superior performance. As shown in FIG. 2, a novel sparsity based algorithm for surface material classification is applied. Further, a novel and accurate deep neural network (DNN) algorithm for concentration estimation of chemicals in rocks is also applied.

The following sections describe the details of the components of the proposed system for enhancing the predictive accuracy of surface characteristics of Mars from orbit.

1. Novel Two-Step Image Registration Algorithm

Accurate image registration is important in generating high spatial and high spectral resolution images from THEMIS and TES. As shown in FIG. 2, image registration is needed in aligning different types of images (e.g. THEMIS and TES). After image registration/alignment, anomaly detection, rock classification, and concentration estimation can then be performed.

The block diagram of the two-step image registration approach is shown in FIG. 3. Given two images, the first step corresponds to initialization with RANSAC, as mentioned in the paper described in the "BACKGROUND OF THE INVENTION" above.

In this first step, Speeded Up Robust Features (SURF) or Scale Invariant Feature Transform (SIFT) features, as mentioned in the papers above, are detected in both images. These features are then matched, followed by applying RANSAC to estimate the geometric transformation. Assuming one image is the reference image, the other image content is then projected to a new image that is aligned with the reference image using the estimated geometric transformation with RANSAC.

The second step uses the RANSAC-aligned image and the reference image and applies Diffeomorphic Image Registration, as mentioned in the paper above, and further explained in more detail below.

Diffeomorphic Image Registration

The following example illustrates the performance of the 2-step image registration approach: "*Demonstration of sub-pixel level registration errors with the two-step registration approach using actual Mars Mastcam images* (Solday 188)"

The present invention uses one of the Mastcam stereo image pair (RGB images) to demonstrate the effectiveness of the two-step image registration approach. This stereo image is a partial image from the Solday 188 data. In FIG. 4, (a) shows the left Mastcam image which will be used as the reference image; (b) shows the right Mastcam image which is going to be aligned to the left camera image; (c) shows the aligned image after the first step with RANSAC; and (d) shows final aligned image after the second step with Diffeomorphic registration.

To show the effectiveness of the registration approach, the difference image between the aligned image and the left camera image in each of the two steps of the two-step registration approach is first used. The difference images can be seen in FIG. 5, (a) and (b), respectively. It can be noticed that the registration errors can be easily noticed in the first step of registration with RANSAC. After the second step with Diffeomorphic image registration, the errors in the difference image is hardly noticeable.

To assess the performance of the two-step registration accuracy, a "pixel-distance" type measure is designed. In this measure, first find SURF features in the reference and the aligned images in each step. Then find the matching SURF features in the reference image and aligned image. Further, repeating these procedures for the pair of "reference image and RANSAC aligned image" and "reference image and final aligned image". Finally, find the norm values for each matching SURF feature pair. The average of the norm values is considered as a quantitative indicator that provides information about the registration performance.

In FIG. 6, (a) and (b) show the matching features in each step of the two-step registration approach; and (c) shows the resultant pixel distances in the matched SURF features in each step of the two-step registration approach. It can be clearly noticed that the second step of the two-step registration process reduces the registration errors to subpixel levels.

2. Novel Spatial and Spectral Resolution Enhancement Algorithm

In remote sensing domain, a common and successful approach to achieving super resolution is Pan-Sharpening. Pan-Sharpening is an image fusion technique which uses a high resolution single band Panchromatic (PAN) image and low resolution multi-spectral image to produce high resolution multi-spectral images. Compared to multi-view based and example based super-resolution technique, pan-sharpening can produce much higher resolution data and is much more reliable and accurate.

The Pan-Sharpening idea can also be applied to hyperspectral images, as mentioned in the papers above. The present invention develops a novel approach which extends the idea of Pan-Sharpening by using multiple high resolution bands to reconstruct high resolution hyperspectral image. The motivation is practical: there are many satellite sensors or airborne sensors which take high resolution color images. For instance, the resolution of IKONOS color image data is 0.5 meter. Specifically, the present invention proposed an algorithm called Color Mapping, which is efficient and parallelizable. Extensive studies and results show that the proposed method can generate highly accurate high resolution reconstruction than simple bicubic scaling and other state-of-the-art methods. In addition, very thorough classification study using reconstructed images are also performed. Results also show that the proposed method performs much better than other methods.

Color Mapping

The idea of color mapping is as the name suggests: mapping a multispectral pixel to a hyperspectral pixel. Here, multispectral images encompass color (RGB) images. This mapping is based on a transformation matrix T, i.e.

$X=Tx$, where X is one (or more) hyperspectral pixels and x is one (or more) multispectral pixels.

To get the transformation matrix, we simulate a low resolution multispectral image and use the low resolution hyperspectral image to train the T.

FIG. 7 shows the system flow.

Training is done by minimizing the mean square error:

$$T^* = \arg\min_T \|H - TC\|_F,$$

where H is the set of hyperspectral pixels and C is the set of multi-spectral pixels.

With enough pixels, the optimal T can be determined by:

$T=XC^T(CC^T)$.

Hybrid Color Mapping

For many hyperspectral images, the band wavelengths range from 0.4 to 2.5 um. For color/multispectral images, the bands may include R, G, B, and some additional spectral bands. As shown in FIG. 8, we also add a white band, i.e. all pixels' value is 1. This white band can be used to compensate for atmospheric effect and other bias effects. Mathematically, adding a white band is equivalent to increasing one more column in the T matrix. Hence, more parameters to adjust in the transformation are available.

Local Color Mapping

The present invention further enhances the proposed method by applying color mapping patch by patch as shown in FIG. 9. A patch is a sub-image in the original image. Each patch will have a local transformation matrix. In this way, spatial correlation can be exploited. In addition, since the task is split into many small tasks, the process can be easily parallelized.

Experiment

The present invention used AVIRIS hyperspectral data in this study. In each experiment, we downscaled the image by 3 times using bicubic interpolation method. The downscaled image was used as low resolution hyperspectral image. Picking R, G, B bands from original high resolution hyperspectral image for color mapping. The bicubic method in the following plots was implemented by upscaling the low-resolution image using bicubic interpolation. The results of bicubic method were used as a baseline for comparison study. FIG. 10 shows classification results using the endmembers extracted from ground truth AVIRIS hyperspectral image. The AVIRIS image has 213 bands with wavelengths range from 380 nm to 2500 nm. Hybrid color mapping is significantly better than the bicubic method.

3. Novel Anomaly Detection Algorithm for Hyperspectral Images

Kernel RX (KRX) is a generalization of the well-known anomaly detection algorithm known as Reed-Xiaoli (RX) algorithm. When the kernel distance function is defined as the dot product of two vectors, KRX is the same as RX. While KRX is more flexible than RX, it is significantly slower than RX. The present invention developed a novel algorithm which can perform a fast approximation of the traditional KRX as mentioned in one of the papers above. The algorithm is based on clustering and named a Cluster Kernel RX (CKRX). As a matter of fact, CKRX is a generalization of KRX. That is, CKRX is reduced to KRX under some specific settings.

The basic idea of CKRX is: first cluster the background points and then replace each point with its cluster's center. Then, after replacement, the number of unique points is the number of clusters, which can be very small comparing to the original point set. Although the total number of points does not change, the computation of the anomaly value can be simplified using only the unique cluster centers, which improves the speed by several orders of magnitudes.

The present invention shows some ROC curves obtained by using actual hyperspectral images from the AF. Many algorithms have been implemented and compared. As shown in FIG. 11, it shows the ROC curves. Both the KRX and the CKRX produce excellent performance, as their ROC curves almost reach ideal performance.

4. Novel Rock Classification Algorithm

In surface characterization of Mars, accurate rock classification is important for mapping out the Mars surface. Although there are some existing classification algorithms in the papers as mentioned above, the present invention proposes to apply the latest development in sparsity based classification algorithm to rock type classification. Like other methods, the approach of the present invention requires some spectral signatures to be available.

In the present invention, a sparsity-driven recognition method such as the method described in the papers mentioned above has been implemented. The Extended Yale B face database mentioned in the paper above has been used for performance evaluation. In addition to frontal face images, the present invention introduced rotation effects to the test face images to examine the robustness of the global (whole-face) and local (blocks of the face image) versions of the method. The Yale B database contains face images with different illuminations, which are very challenging.

In the sparsity-driven face recognition approach, the assumption is that a face image of subject i lies in the linear span of the existing face images for that same subject i in the training set. Suppose $\{v_{i1}, v_{i2}, \ldots, v_{iD}\}$ are the vectorized D face images of subject i in the training set, and y is a new vectorized face image of subject i, which is not in the training set. Based on this assumption, y, can be expressed as:

$$y = \alpha_{i1} v_{i1} + \alpha_{i2} v_{i2} + \ldots + \alpha_{iD} v_{iD} = [v_{i1} \; v_{i2} \; \ldots \; v_{iD}] \begin{bmatrix} \alpha_{i1} \\ \alpha_{i2} \\ \vdots \\ \alpha_{iD} \end{bmatrix} = A_i \alpha_i \quad (1)$$

Suppose there are C human subjects; the above expression can then be expanded as in (2) below, and this expression indicates that y is the sparse linear combination of face images in the training set.

$$y = [A_1 \; A_2 \; \ldots \; A_C] \begin{bmatrix} \alpha_1 \\ \alpha_2 \\ \vdots \\ \alpha_C \end{bmatrix} = Ax \quad (2)$$

The sparse representation, $x_o = [0 \ldots 0 \; a_i^T \; 0 \ldots 0]$, thus yields the membership of y to subject i. The above framework to small contact detection can be easily extended. Each contact image will be vectorized and put into the dictionary.

In FIG. 12, an illustrative diagram of the global version is depicted. In the global version, the whole-face image is vectorized and the sparsity coefficient vector estimations are done using these whole-face image vectors. Also, a local version of the sparsity driven approach is implemented, which is not shown here due to page limitation.

The recognition performance of the global (whole-face) version, of the sparsity-driven face recognition method has been examined on the Extended Yale B face database. As shown in FIG. 13, there are 38 subjects and each subject has 64 faces with different illuminations. In addition to considering only the frontal images, the test face images are also rotated at four different rotational degrees to see how the performance of the sparsity-driven face recognition method will be affected. It should be noted that the down-sampled images of Extended Yale B face database of size 32×28 are used in this work. Additionally, when rotational effects are introduced to the test face images, the original size image (192×168) has been rotated and then downsampling is applied to the rotated test image. It should be also noted that rotational effects are only applied to the face images in the testing set but not to the face images in the training set. That is, the dictionary only contains the frontal face images.

As shown in FIG. 13, a maximum recognition rate of 100% has been achieved. This high recognition rate is quite remarkable considering that there are number of poor illuminated images.

As shown in FIG. 16, the Classification results of the proposed algorithm. This algorithm can handle both poor illuminated images as well as rotated images. This approach (global) achieves 100% recognition.

5. Novel Concentration Estimation Algorithm

Support Vector Machine (SVM) and non-deep neural networks (NN) have been used in many pattern classification applications. However, it is believed there is a lot of room for further improvement. This is because SVM and non-deep NN have only one or two layers of tunable parameters. Since pattern recognition and concentration estimation are complex and involve sophisticated features, SVM and non-deep NN may be restricted in achieving high classification rate.

The present invention proposes to apply Deep Neural Network (DNN) techniques to further improve the chemical element classification and composition estimation performance in volcano monitoring. Possible applications include ash detection and composition estimation, and $SO_2$ concentration estimation. Two of the DNN techniques are adapted to the element classification and chemical composition estimation problem. They are the Deep Belief Network (DBN) and Convolutional Neural Network (CNN) as mentioned in the paper above. DNN techniques have the following advantages as mentioned in the paper above:

Better capture of hierarchical feature representations;
ability to learn more complex behaviors;
better performance than conventional methods;
use distributed representations to learn the interactions of many different factors on different levels;
can learn from unlabeled data such as using the RBM pretraining method; and
performance can scale up with the number of hidden layers and hidden nodes on fast GPUs.

In the past few years, research has been heavily conducted in applying DNN for various applications as mentioned in the paper above. One of the applications which DNN techniques have proved themselves is the handwritten digit recognition application. The present invention applied the Deep Belief Network (DBN) technique to the Laser Induced Breakdown Spectroscopy (LIBS) spectrum database (66 samples) in the past as a preliminary investigation. The total number of oxides is 9 and these 9 oxide compounds are:

1) $SiO_2$; 2) $TiO_2$; 3) $Al_2O_3$; 4) $Fe_2O_3$; 5) MnO; 6) MgO; 7) CaO; 8) $Na_2O$; and 9) $K_2O$.

A Leave-One-Out (LOO) testing framework is applied to the LIBS dataset of 66 samples to estimate oxide compositions. Two performance measures are computed:

a) Error sum: the sum of absolute error in the sample estimate and its ground truth; and
b) Root-Mean-Square Error of Prediction (RMSEP): to assess the estimation accuracy for each of the 9 oxide compounds.

The initial results were quite encouraging for a DBN with 3-Level architecture:

Level-1: RBM with 50 hidden units;
Level-2: RBM with 50×50 hidden units; and
Level-3: connection to output with NN with 1000 epochs.

Comparable results for DBN to the PLS technique were observed. The resultant performance measures with PLS and DBN technique can be seen in FIG. 17. It is quite likely to see further improvement in the composition estimation results after customization of the DBN architecture and the number of hidden DBN units.

FIG. 17 shows the preliminary results with the adaptation of DBN technique to chemical composition estimation in LIBS. RMSEP values for each oxide compound. There are 9 oxides, lower RMSEP indicates better estimation accuracy.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

The invention claimed is:

1. A system for enhancing predictive accuracy of planet surface characteristics using a local personal computer, comprising:
   an image registration unit using a two-step algorithm having an input connected to a Thermal Emission Imaging System (THEMIS) imager and another input connected to a Thermal Emission Spectrometer (TES) imager;
   a spatial resolution enhancement unit using a Hybrid Color Mapping (HCM) algorithm having an input connected to an output of the image registration unit;
   an anomaly detection unit using a Cluster Kernel Reed-Xiaoli (CKRX) algorithm is connected to an output of the spatial resolution enhancement unit;
   a sparsity based surface materials classification unit is connected to an output of the anomaly detection unit; and
   a concentration estimation unit using a deep learning based algorithm is connected to an output of the sparsity based surface materials classification unit to provide rock types and concentration estimation results.

2. A system for enhancing predictive accuracy of planet surface characteristics using a local personal computer in accordance to claim 1, wherein:
   the image registration unit achieves sub-pixel accuracy for accurate images alignment collected from the two imagers.

3. A system for enhancing predictive accuracy of planet surface characteristics using a local personal computer in accordance to claim 2, wherein:
   the spatial resolution enhancement unit improves the spatial resolution of the collected images from the two imagers.

4. A system for enhancing predictive accuracy of planet surface characteristics using a local personal computer in accordance to claim 3, wherein:
   the anomaly detection unit processes the improved images from the spatial resolution enhancement unit and generate alerts for regions that are different from neighbors.

5. A system for enhancing predictive accuracy of planet surface characteristics using a local personal computer in accordance to claim 1, wherein:
   the sparsity based surface materials classification unit is for rocks.

6. A system for enhancing predictive accuracy of planet surface characteristics using a local personal computer in accordance to claim 1, wherein:
   the concentration estimation unit is a Deep Neural Network (DNN) unit for materials in Mars or other planet surface.

7. A system for enhancing predictive accuracy of planet surface characteristics using a local personal computer in accordance to claim 1, wherein:
   the system provides a user friendly graphical user interface (GUI) that will allow operators to visualize the fused high resolution images, the anomalous regions, the concentration estimation results, and the surface material classification results.

8. A system for enhancing predictive accuracy of planet surface characteristics using a local personal computer in accordance to claim 1, wherein:
   processing software of the entire system is executed in the local personal computer or in a Cloud.

9. A method for enhancing predictive accuracy of planet surface characteristics, comprising the steps of:
   registering multispectral and hyperspectral images from materials of a surface;
   enhancing spatial and spectral resolutions of the registered multispectral and hyperspectral images;
   detecting any anomaly of the enhanced registered multispectral and hyperspectral images;
   classifying detected surface materials based on the enhanced registered multispectral and hyperspectral images and any detected anomaly;
   estimating concentration level of the classified surface materials;
   determining the surface materials types based on estimated concentration level;
   selecting a pair of enhanced registered multispectral and hyperspectral images;
   detecting features of the pair of enhanced registered multispectral and hyperspectral images;
   matching the features of the pair of enhanced registered multispectral and hyperspectral images;
   applying Random Sample Consensus (RANSAC) to estimate the geometric transformation;
   selecting one image of the enhanced registered multispectral and hyperspectral image pair as a reference image;
   aligning the other enhanced registered multispectral and hyperspectral image pair with RANSAC;
   combining the reference image and the aligned image; and
   applying Diffeomorphic registration to the combined images.

10. A method for enhancing predictive accuracy of planet surface characteristics in accordance to claim 9, wherein the enhancing spatial and spectral resolution steps further comprising the step of:
    generating high resolution hyperspectral images by applying multiple high resolution bands to the registered images in a Pan-Sharpening approach.

11. A method for enhancing predictive accuracy of planet surface characteristics in accordance to claim 10, wherein the Pan-Sharpening approach further comprising the step of:
    mapping a multispectral pixel to a hyperspectral pixel of the hyperspectral images.

12. A method for enhancing predictive accuracy of planet surface characteristics in accordance to claim 10, wherein the Pan-Sharpening approach further comprising the step of:
    adding a white band to the multispectral bands to produce the hyperspectral images.

13. A method for enhancing predictive accuracy of planet surface characteristics in accordance to claim 10, wherein the Pan-Sharpening approach further comprising the step of:
    applying color mapping patch to each of the multispectral images to produce the hyperspectral images.

14. A method for enhancing predictive accuracy of planet surface characteristics in accordance to claim 9, wherein the anomaly detection step further comprising the steps of:
    downscaling the detected multispectral images by 3 times;
    using the downscaled image as low resolution hyperspectral images; and
    picking R, G, B bands from the high resolution hyperspectral images for color mapping.

15. A method for enhancing predictive accuracy of planet surface characteristics in accordance to claim 9, wherein the detected surface materials classification step further comprising the steps of:
    acquiring some available spectral signatures;

comparing the detected multispectral and hyperspectral images with the spectral signatures using a sparsity-driven recognition method; and evaluating performance using actual Thermal Emission Imaging System (THEMIS) and Thermal Emission Spectrometer (TES) images in NASA's data archive.

16. A method for enhancing predictive accuracy of planet surface characteristics in accordance to claim 9, wherein the concentration estimation step further comprising the step of:

applying Deep Belief Network (DBN) technique to the Laser Induced Breakdown Spectroscopy (LIBS) spectrum database;

applying a Leave-One-Out (LOO) testing framework to the LIBS database to estimate oxide compositions; and computing two performance measures, Error sum and Root Mean Squared Error of Prediction (RMSEP), to assess the estimation accuracy.

* * * * *